April 15, 1924.  1,490,695

T. W. DAVIS

CONNECTER

Filed March 22, 1921

Thomas W. Davis, Inventor

By his Attorney

Lewis J. Doolittle

Patented Apr. 15, 1924.

1,490,695

UNITED STATES PATENT OFFICE.

THOMAS W. DAVIS, OF ELIZABETH, NEW JERSEY.

CONNECTER.

Application filed March 22, 1921. Serial No. 454,526.

*To all whom it may concern:*

Be it known that I, THOMAS W. DAVIS, citizen of the United States, and resident of Elizabeth, in the county of Union and State of New Jersey, have invented certain new and useful Improvements in Connecters, of which the following is a specification.

This invention relates to terminal connecters or couplings for use with electric conduits and conductors to join such conduit or conductor to any suitable outlet, junction, panel, or service box; the invention being adapted for use with the different types of conduits or conductors, which may be flexible metallic, flexible non-metallic, sheathed, armored, or of other type.

The present invention has for its object, generally speaking, to provide a simple and inexpensive coupling capable of quick and easy attachment or detachment with any ordinary conduit or conductor, and which will securely grip the conductor without injury to the same.

The present improvement has for its particular object to cheapen the cost of construction and to provide an efficient gripping action on the conductor or conduit.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of a cable connecter or coupling embodying the invention.

Figure 1:
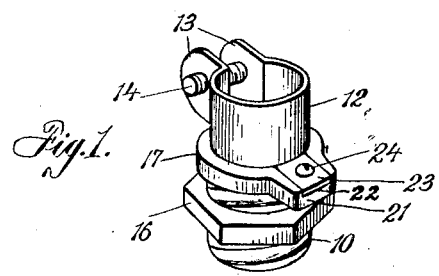
Figure 2:
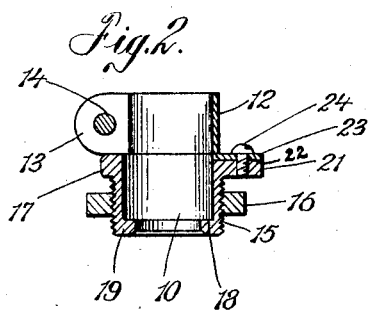
Fig. 2 is a vertical sectional view thereof, showing a modification of the threaded body portion.
Figure 3:
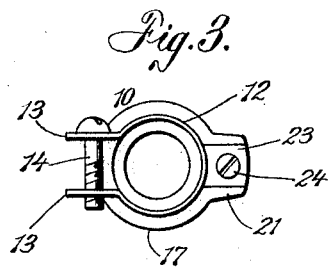
Fig. 3 is an end view of the top of Fig. 1.
Figure 4:
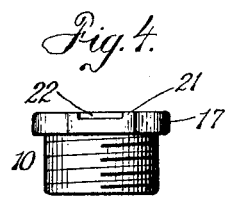
Fig. 4 is a detail side view of the shell or body, this view being at right angles to Fig. 2.

As here shown, my improved coupling comprises a metallic shell or body 10 of cylindrical shape which forms a support for a flexible clamp for engaging the sheathed conductor to be connected. This clamp is in the form of a metal strap 12 bent so that its jaws nearly encircle the conductor and having its ends extended in the form of ears 13, which are provided with holes to receive a bolt or screw 14 by which they are drawn together and the strap 12 bound or clamped upon the conductor. The shell 10 is formed with exterior screw threads 15 upon which is threaded the nut 16, the screw threads being either of the usual cut threads when a cast body portion is used, as shown in Fig. 2, or pressed threads when a thin shell is used, as in Fig. 1. An exterior circumferential flange 17 is formed on one end of the shell, preferably that upon which the strap 12 is positioned. A shoulder 18, against which the end of the conductor sheath abuts, is formed by an interior flange 19 at the other end of the shell 10. These parts as thus generally described provide means for securing the clamp to the shell. With the present construction I eliminate many objectionable features of construction and also reduce the cost of manufacturing the coupling.

In constructing the coupling according to the present invention, I form the flange 17 of the shell 10 with a lateral projection or lug 21 having a flat upper face in which is formed a radial groove 22, this groove extending inwardly to the bore of the shell.

I also form an integral tail 23 on the strap 12 which projects from the bottom edge thereof diametrically opposite the ears 13, this tail being bent at right angles to the axis of the coupling. The two clamping jaws of the clamp are thus left free for practically their entire length for movement toward or away from one another as screw 14 is tightened or loosened, thus providing a uniform clamping contact. The tail 23 rests snugly in the groove 22, to which it corresponds both as to length, width and depth or thickness, so that the engagement of the tail in the groove accurately positions the clamp on the shell in substantial axial alinement therewith and also relieves the means by which it is secured to the lug 21 from strain. The tail 23 may be secured to the lug 21 by a screw 24 passing through a suitable aperture therein and threaded into the lug or it may be secured by riveting, welding or otherwise to hold the clamp 12 in position on the shell 10.

As will be apparent, with this arrangement of parts, the clamp 12 has an unrestricted binding action on the conductor while at the same time the cost of construction is decreased and the assembling of the parts is simplified.

What I claim is:

1. A terminal connecter for electric conduits, comprising a shell having a lateral projection at one end formed with a radial groove extending to the bore of the shell, and a clamp, said clamp comprising clamping jaws freely movable independently of said shell and having a tail bent at an angle to the axis of the coupling and fitting in said groove.

2. A terminal connecter for electric conduits, comprising a shell forming a support for a clamp and provided with a circumferential flange at the end of said shell to which said clamp is attached, said flange being provided with a projection at one side in which a groove is formed, a clamp having freely movable clamping jaws and a tail projecting therefrom diametrically opposite the opening in said jaws positioned and attached in said groove, engaging both sides and bottom of the same, holding said clamp and shell in axial alinement.

Signed at Elizabeth, in the county of Union and State of New Jersey, this 14th day of March, A. D. 1921.

THOMAS W. DAVIS.